United States Patent
Enrietti (10) Patent No.: US 8,496,469 B2
(45) Date of Patent: Jul. 30, 2013

(54) CLOSURE ASSEMBLY FOR AN INJECTION UNIT OF PLASTIC MATERIAL WITH MICROMETRICAL REGULATION OF THE CLOSURE ROD, AND CORRESPONDING DEVICE FOR REGULATING MICROMETRICALLY AND FIXING A THREADED ELEMENT

(75) Inventors: Piero Enrietti, Donnas (IT); Roberto Enrietti, legal representative, Pont Saint Martin (IT)

(73) Assignee: Thermoplay S.p.A., Pont Saint Martin (IT)

( * ) Notice: Subject to any disclaimer, the term of this patent is extended or adjusted under 35 U.S.C. 154(b) by 0 days.

(21) Appl. No.: 13/394,337

(22) PCT Filed: Dec. 1, 2010

(86) PCT No.: PCT/IT2010/000477
§ 371 (c)(1), (2), (4) Date: Nov. 26, 2012

(87) PCT Pub. No.: WO2011/067800
PCT Pub. Date: Jun. 9, 2011

(65) Prior Publication Data
US 2013/0087731 A1    Apr. 11, 2013

(30) Foreign Application Priority Data
Dec. 2, 2009  (IT) ............................... BI2009A0015

(51) Int. Cl.
*B29C 45/23* (2006.01)
(52) U.S. Cl.
USPC .................. 425/564; 264/328.9; 425/566
(58) Field of Classification Search
USPC ........ 425/562, 563, 564, 565, 566; 264/328.9
See application file for complete search history.

(56) References Cited

U.S. PATENT DOCUMENTS

| | | | | |
|---|---|---|---|---|
| 6,419,870 B1 * | 7/2002 | Lee et al. | | 425/564 |
| 7,182,893 B2 * | 2/2007 | Olaru | | 425/566 |
| 7,347,684 B2 * | 3/2008 | Tabassi et al. | | 425/564 |
| 7,410,354 B2 * | 8/2008 | Olaru | | 425/564 |
| 2006/0065991 A1 | 3/2006 | Tabassi et al. | | |

FOREIGN PATENT DOCUMENTS

EP    0670211 A1    9/1995

OTHER PUBLICATIONS

PCT International Search Report mailed on Mar. 15, 2011 for International Application PCT/IT2010/000477 filed on Dec. 1, 2010 in the name of Thermoplay S.P.A.

(Continued)

*Primary Examiner* — Tim Heitbrink
(74) *Attorney, Agent, or Firm* — Steinfl & Bruno, LLP (57) ABSTRACT

Closure assembly (10), for an injection unit (11) of plastic material (MP), comprising: a closing rod (16); a driving piston (15) adapted to drive an axial movement (f1) of the closing rod (16) between an open position (P1), in which the closing rod (16) opens an injection hole (13') of a mold (13), and a closed position (P2), in which the closing rod (16) closes the injection hole (13'); an adjustment element or nut (20, 21), provided of a fine-pitch threading (21*a*), that is adapted to be screwed or unscrewed in one sense or the other (f2) in a corresponding threaded portion (22*b*) of an internal seat (22), formed in the driving piston (15), in order to regulate axially, in a micrometric way, the closing rod (16) in the closed position (P2); and an elastic washer (30, 31) that is provided for cooperating with a plurality of projections and notches (23*a*, 23*b*), formed in such internal seat (22, 22*a*), in order to fix the adjustment element (21) with respect to the body (15*a*) of the driving piston (15), once the closing rod (16) has been exactly regulated in the desired closed position (P2). Advantageously the adjustment element (21) is entirely housed in the internal seat (22) formed in the driving piston (15), whereby it does not protrude from the body (15*a*) of the latter.

8 Claims, 3 Drawing Sheets

OTHER PUBLICATIONS

PCT Written Opinion mailed on Mar. 15, 2011 for International Application PCT/IT2010/000477 filed on Dec. 1, 2010 in the name of Thermoplay S.P.A.

PCT International Preliminary Report on Patentability mailed on Dec. 5, 2011 for International Application PCT/IT2010/000477 filed on Dec. 1, 2010 in the name of Thermoplay S.P.A.

* cited by examiner

CLOSURE ASSEMBLY FOR AN INJECTION UNIT OF PLASTIC MATERIAL WITH MICROMETRICAL REGULATION OF THE CLOSURE ROD, AND CORRESPONDING DEVICE FOR REGULATING MICROMETRICALLY AND FIXING A THREADED ELEMENT

CROSS REFERENCE TO RELATED APPLICATIONS

The present application is the US national stage of International Application PCT/EP2010/000477 filed on Dec. 1, 2010, which in turn claims priority to Italian Patent Application B109A000015 filed on Dec. 2, 2009.

TECHNICAL FIELD

The present invention generally concerns the sector of the injection moulding of plastic material, and more particularly it refers to a closure assembly which is associated with an injection unit for the moulding of plastic material and is adapted to regulate in a micrometric way and to fix the axial position, closed, of a respective closure/cling rod or pin.

The present invention also concerns a corresponding and more general regulation device or system for regulating in a fine and micrometric way the axial position of a threaded element, like a screw, and to firmly fix it at the end of such regulation.

BACKGROUND ART

In the machines for the injection moulding of plastic material, the injection units are provided for receiving the plastic material, in a molten or fluid state, from a feeding unit and for injecting it at high pressure into the hollow of a mould.

These injection units can be of various type and, for instance, they can be associated with a closure group or assembly, in turn comprising a closing rod or stem or pin which is adapted to selectively open or close, by the respective tip, an injection hole, often called also "gate", in order to control the duration of the injection stage and hence the quantity of the fluid plastic material injected into the mould.

More in detail, in the injection units of this type, the closing rod is driven to move alternately, along its axis, between an open position, in which the tip of the closing rod set free and opens the injection hole, whereby the molten plastic material can freely flow into the hollow of the mould, and a closed position, in which such tip closes the injection hole so as to interrupt the flow of the molten plastic material from the injection unit toward the hollow of the mould.

This axial alternate movement of the closing rod is for instance driven and controlled by a hydraulic or pneumatic piston, which is associated with an end of the closing rod and is subject to the pushing action, along the two directions, of a fluid in pressure, as compressed air, in turn controlled, in the flow towards and from the pneumatic piston, by a valve system of known type.

The open position of the closing rod, in correspondence of which the injection hole is, as said, open and adapted to allow the free flow of the molten plastic material towards the mould, usually does not need to be accurately regulated.

By contrast, it is instead very important, in order to optimize and to obtain the maximum outcome of the operation of injection, to control and adjust with extreme care and precision the closing rod in the respective closed position, in which, as said, the tip of the closing rod closes the injection hole and thereby interrupts the flow of the molten plastic material towards the hollow of the mould.

At present there are in use a lot of different solutions, systems and devices, to adjust the closing rod in the respective closed position.

For instance, a known solution adopts a threaded nut, that is mounted on the pneumatic piston which drives the axial motion of the closing rod, with this being associated with a click mechanism comprising a ratchet or pawl, in turn adapted to be triggered elastically in a plurality of seats, whereby, by rotating this threaded nut, between a click and the other of the ratchet in these seats, it is possible to vary and to adjust the axial position of the closing rod with respect to the body of the injection unit.

This solution has, however, the drawback that it is constructively very complex because of the presence of the click mechanism, and moreover that it is cumbersome, since the threaded nut constitutes an additional piece which protrudes from the body of the piston that drives the closing rod.

Also it is known to adjust the closing rod in the respective closed position by using one or more elements of a determined thickness, i.e. by interposing them between the piston, movable axially, which drives the closing rod, and the area, of the fixed body of the injection unit, against which the same piston is pushed and enters into contact in correspondence of the closed position of closing rod.

This other solution is clearly uncomfortable and of complex actuation.

DISCLOSURE OF THE INVENTION

Therefore a first object that the present invention aims to achieve is to provide a closure assembly, for an injection unit of plastic material, that is adapted to regulate exactly and in a fine and micrometric way, in particular by rotating a threaded element like for instance a nut or a screw, a closing rod of the closure assembly in a determined axial position, corresponding to a closed position in which the closing rod closes an injection hole of the injection unit, without being affected by the drawbacks of the actual technique, as above outlined.

A more general object, however linked to the previous one, of the present invention is also to provide a corresponding regulation device or system, suitable for regulating in a micrometric way a threaded element, as for instance a nut or a screw, in one determined axial position, which device and system innovate in comparison to those at present known, and in particular combine the capability of performing such micrometric regulation in an axial sense also with the capability of fixing in a sure and stable way the threaded element in the determined axial position that is reached at the end of the regulation.

The aforesaid objects appear to be fully achieved by the closure assembly, for an injection unit of plastic material, and by the device, for the micrometric regulation and the fixing of a threaded element, having the characteristics recited by the independent claims.

Particular embodiments of the closure assembly and of the micrometric regulation and fixing device of the invention are defined by the dependent claims.

BRIEF DESCRIPTION OF THE DRAWINGS

These and other objects, characteristics and advantages of the present invention will clearly appear from the following description of a preferred embodiment thereof, provided solely by way of a non-limiting example with reference to the accompanying drawings, where.

DESCRIPTION OF A CLOSURE ASSEMBLY CORRESPONDING TO A FIRST PREFERRED EMBODIMENT OF THE INVENTION

With reference to the drawings, a closure assembly, having the characteristics of the present invention, is indicated in the whole with 10.

Figures 1, 1A:
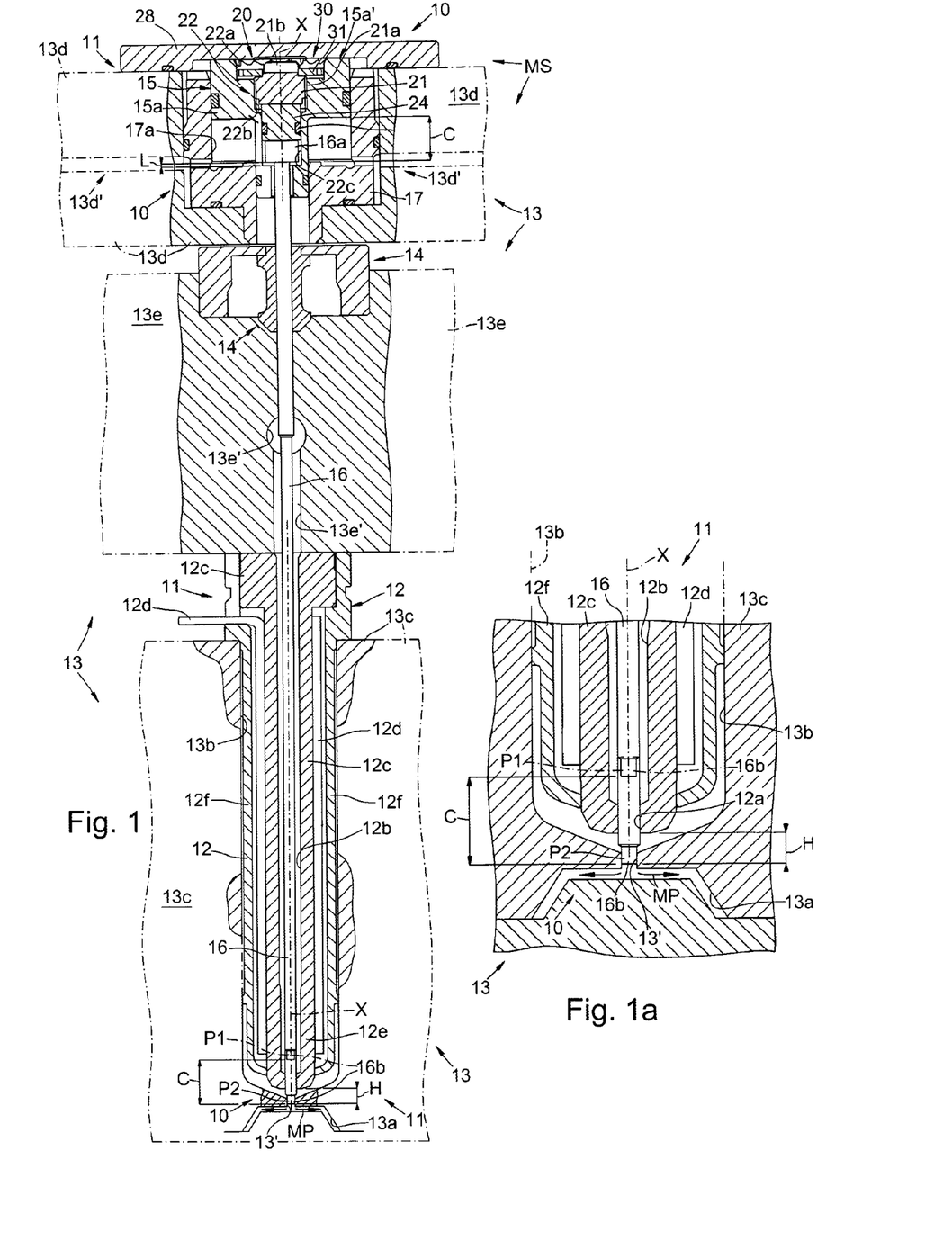
FIG. 1 is a partial sectional view, along a longitudinal plane, of an injection unit of plastic material associated with a closure assembly, according to the present invention, represented with a respective closing rod arranged in an open position.
FIG. 1a is a view, in enlarged form, of the region of a tip of the closure assembly of FIG. 1, with the closing rod being arranged in a closed position.
Figure 2:
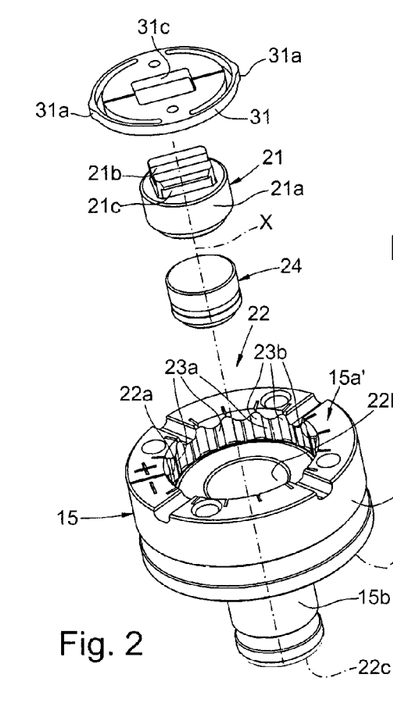
FIG. 2 is partial perspective view, in exploded form, of the closure assembly of FIG. 1.

The closure assembly is associated with an injection unit, generally indicate with 11 and schematically represented in FIG. 1, for the injection of plastic material MP into a mould, indicated with 13, in the framework of a more general system or machine MS for the moulding of plastic material.

The injection unit 11 in turn includes an injection nozzle 12 adapted to directly inject the plastic material MP into the hollow or matrix 13a of the mould 13, through an injection hole 13', defined by the same mould 13.

To this purpose, the injection nozzle 12 is generally housed in a respective seat 13b, formed in a nozzle-bearing plate 13c of the mould 13, and usually comprises an internal body 12c, that defines a flow channel 12b adapted to convey the flow of the plastic material MP toward the injection hole 13'; heating means 12d, of known type, as an electric resistance, that are associated with the internal body 12c in order to hold in temperature the injection nozzle 12; and still an external shell 12f, having a form corresponding to that of the seat 13b, of the mould 13, in which the injection nozzle 12 is housed.

In this configuration the closure assembly 10 is supported on the upper part by a fixed support plate 13d, also called bottom plate, of the mould 13, and in detail comprises:
- a driving piston 15 adapted to move axially along a respective axis X;
- a closure/closing rod or stem or pin 16 extending coaxially to the driving piston 15 and having a respective first end or head 16a, suitable for being driven by the driving piston 15, and a respective second end or tip 16b, opposite to the first end 16a, suitable for cooperating with the injection hole 13', defined by the mould 13, through which the plastic material MP, at the molten state, is injected by the injection nozzle 12 into the hollow 13a of the mould 13.

The head 16a, preferably of cylindrical form, exhibits greater radial dimensions, whereby it protrudes from the adjacent remaining part, also cylindrical and extending in axial sense, of the closing rod 16.

Figure 3:
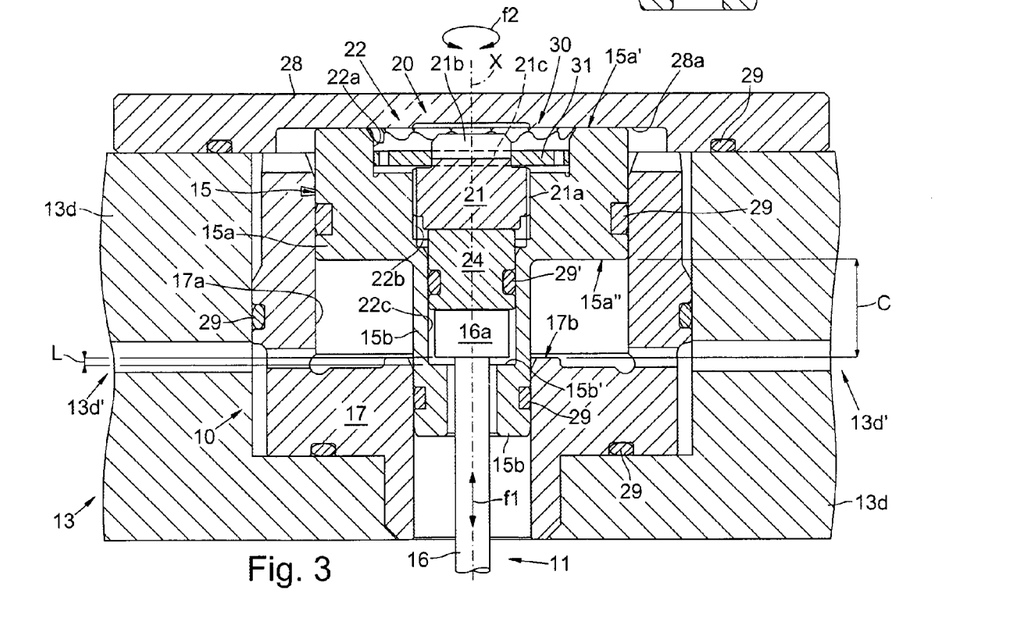
FIG. 3 is a section view, in enlarged scale, of a region of the closure assembly of FIG. 1, including a driving piston.
Figure 4:
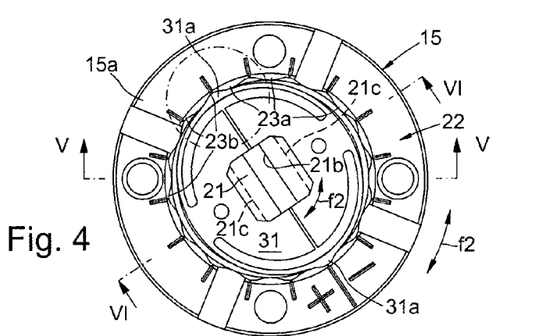
FIG. 4 is a plan view of the region of FIG. 3.
Figure 5:
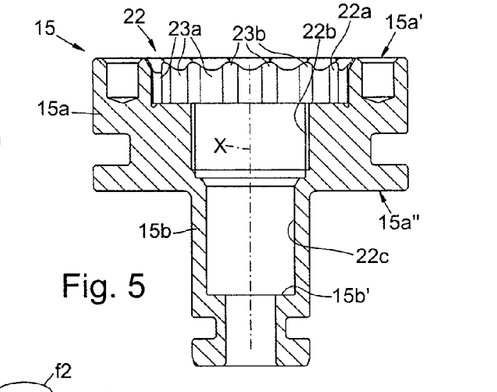
FIG. 5 is a longitudinal section view, corresponding to line V-V of FIG. 4, of the driving piston.

The driving piston in turn 15 includes a respective body 15a, cylindrical, that is provided for translating in the two senses, along the axis X, in a cylindrical room 17a formed in a body 17 fixed and integrated in the support plate 13d, in order to drive a corresponding alternate axial movement of the closing rod 16, as schematized in FIG. 3 by a double arrow f1, between an open position, indicated with P1, in which the closing rod 16 sets free and opens by the respective tip 16b the injection hole 13', so as to allow the molten plastic material MP to flow from the injection unit 11 to the hollow 13a of the mould 13, and a closed position, indicated with P2, in which the closing rod 16 closes by the respective tip 16b the injection hole 13', so as to interrupt and to prevent the flow of the plastic material MP from the injection nozzle 12 to the hollow 13a of the mould 13.

The axial stroke of the driving piston 15, corresponding to the stroke of the tip 16b of the closing rod 16 between the positions P1 and P2, is indicated with C and is for instance about 10 mms.

It is specified that in FIG. 1 the closure assembly 10 is represented with the respective closing rod 16 arranged in the open position P1, while the closed position P2 of the closing rod 16 is represented by dot-dash line.

For clarity, instead FIG. 1a represents by continuous line and in enlarged scale the zone of the tip 16b of the closure rod 16, when arranged in the respective closed position P2.

A cover 28 is fixed on the support plate 13d and exhibits a surface 28a against which an upper side 15a' of the body 15a of the driving piston 15 is pushed into contact, at an end of the alternate motion of the driving piston 15, in turn corresponding to the open position P1 of the closing rod 16.

The body 15a of the driving piston 15 exhibits moreover a respective lower side 15a'', that is arranged on the side of the closing rod 16 and is adapted to enter into contact with a surface 17b, defined by the body 17, at the other end of the alternate motion of the driving piston 15, corresponding to the closed position P2 of the closing rod 16.

In turn the fixed support plate 13d internally defines a hydraulic or pneumatic circuit, of known characteristics, schematically represented and indicated generally with 13d', which is configured to convey, under the control of a valve system, also of known characteristics, a fluid in pressure toward and from the cylindrical vane 17a, so as to selectively exert a pressure on the side 15a' or 15a'' of the driving piston 15, slidable in the cylindrical vane 17a, and thereby to alternately move the driving piston 15 along the axis X between the two end positions, corresponding, as said, to the contact of the sides 15a' and 15a'' respectively against the surface 28a of the cover 28 and the surface 17b of the body 17.

Moreover the driving piston 15 is shaped with a cylindrical portion 15b, adjacent to the cylindrical body 15a but of smaller diameter, which extend axially from the lower side 15a'' and in which inside the head 16a of the closing rod 16 is housed.

Suitable sealing means, indicated with 29 and in particular comprising rings of the "O-ring" type, are provided for sealing the space between the various portions, either fixed or relatively movable, which define the closure assembly 10, so as to allow its correct operation and also to ensure the sealing, against any leakage toward the outside, of the fluid in pressure that is used for driving by means of the piston 15 the alternate motion of the closing rod 16.

The closing rod 16 extends axially, along the axis X, from the zone of the driving piston 15 toward the zone of the injection nozzle 12, while crossing a distribution plate 13e, also usually called hot distribution plate, of the mould 13, which internally defines a distribution network, indicated with 13e', formed by a plurality of channels, for the distribution of the plastic material MP, in the molten state, to the injection nozzle 12 of each injection unit 11.

Still, suitable coupling, guide and sealing elements, generally indicated with 14 (FIG. 14), are interposed in the space between the closing rod 16 and the body of the hot distribution plate 13e, in order to couple these parts, to properly guide the closing rod 16 in its axial motion, and at the same time to seal such space against any leakage toward the outside of the molten plastic material MP which flows at the inside of the distribution network 13e'.

The closing rod 16, after having crossed the hot distribution plate 13e, extends axially inside the flow channel 12b, which is formed along the axis X of the injection nozzle 12 and is adapted to convey the plastic material MP, coming from the hot distribution plate 13e, toward the injection hole 13', in order to inject the plastic material MP into the mould 13.

Still, the closing rod 16 is guided in the tip zone, adjacent to the injection hole 13', of the injection nozzle 12, by a guide hole 12a that is defined by the latter.

Moreover the closure assembly 10 includes micrometric regulation means, indicated generally with 20, for adjusting and regulating in a micrometric way the closing rod 16 in the respective closed position P2.

In detail, according to a characteristic of the present invention, the micrometric regulation means 20 include at least one adjustment element or nut 21, of substantially cylindrical shape and provided along its external cylindrical surface of a threading 21a, of fine pitch, wherein this adjustment element 21 is adapted to be screwed or unscrewed in a corresponding internal seat 22, threaded, formed along the axis X at the interior of the driving piston 15, in order to adjust in a micrometric way, along such axis X, the relative position of the head 16a of the closure rod 16 with respect to the body 15a of the driving piston 15 and thereby to regulate axially the closing rod 16 in the closed position P2.

Conveniently the adjustment element 21 has at one end a notch 21b for the application of a tool, like a screwdriver, to be used for rotating, i.e. screwing or unscrewing, the adjustment element 21, during the regulation of the closing rod 16 in the closed position P2.

The internal seat 22, formed inside the driving piston 15, and the adjustment element 21 are so configured that the latter is entirely housed in the internal seat 22, whereby the adjustment element 21 does not project from the upper side 15a' that is defined by the body 15a of the driving piston 15 and is arranged in the opposite area to the closing rod 16.

More in detail, the internal seat 22, threaded, in which the adjustment element 21 is housed, comprises:

a first upper portion 22a, substantially cylindrical, which is formed adjacently to the upper side 15a', spaced from the closing rod 16, of the body 15a of the driving piston 15, and which is provided along its internal cylindrical surface with a plurality of projections and notches, respectively 23a and 23b;

a second threaded portion 22b, intermediate, formed substantially at the inside of the body 15a of the driving piston 15, in which second portion 22b the adjustment element 21 is housed, and with respect to which it is adapted to be screwed or unscrewed, in the two senses, in order to adjust the closing rod 16 in the closed position P2; and a third lower portion 22c, formed substantially inside the cylindrical portion 15b, of smaller diameter, of the driving piston 15, which third portion 22c houses the head 16a of the closing rod 16.

More in detail, this third portion 22c of the internal seat 22 is delimited by a surface 15b', defining a stair inside the portion 15b of the driving piston 15, wherein this surface 15b' is provided for cooperating with the head 16a, radially projecting, of the closing rod 16, in order to push and drag the closing rod 16 in its axial movement from the closed position P2 to the open position P1.

Conveniently an intermediate element 24, not threaded, is interposed between the adjustment element 21 and the head 16a of the closing rod 16, in order to cooperate into contact with the head 16a and thereby transmit to the closing rod 16 the axial regulation that is set up by rotating the adjustment element 21, as in the following more clearly described.

In detail the intermediate element 24 is housed in the same seat, as defined by the third portion 22c of the seat 22, which houses the head 16a of the closing rod 16, with a sealing ring 29' being interposed between such intermediate element 24 and the surface 22c of the seat 22, in order to ensure the sealing against any leakage of the fluid in pressure that is used to drive the closing rod 16.

Therefore, in this configuration, the intermediate element 24 is provided for staying substantially still, so as to avoid any relative sliding between the sealing ring 29' and the surfaces coupled and into contact with it, i.e. the surface 22c of the seat 22 and that of the groove of the intermediate element 24 in which the same sealing ring 29' is housed, when the adjustment element 21 is screwed or unscrewed in the second threaded portion 22b of the seat 22 in order to regulate the closing rod 16 in the closed position P2.

A certain light L (FIG. 3), suitable for assuring a sufficient range of the regulation in axial sense of the adjustment element 21 and hence of the closing rod 16, is provided between the head 16a, protruding in a radial way, of the closing rod 16, and the surface 15b', of the stair defined by the lower portion 15b of the driving piston 15, that is pushed against the head 16a, during the axial movement of the closing rod 16 from the closed position P2 to the open position P1.

Indicatively this light L is selected so as to assure a range of regulation of the closing rod 16, in the closed position P2, equal to at least 0.5 mm.

Besides, according to a further characteristic of the present invention, there are provided fixing means, associated with the micrometric regulation means 20 and indicated generally with 30, which have the function of firmly fixing the adjustment element 21 with respect to the body 15a of the driving piston 15, once the closing rod 16 has been exactly regulated in the closed position P2.

In detail the fixing means 30 include an elastic washer 31, which is coupled integrally in the rotation to the adjustment element 21 and is externally provided with two protrusions or protruding portions 31a, in turn adapted to cooperate elastically with the projections and the notches, respectively 23a and 23b, that are defined in the upper portion 22a of the internal seat 22 formed at the interior of the driving piston 15.

Figures 6, 7, 7A, 8, 9A:
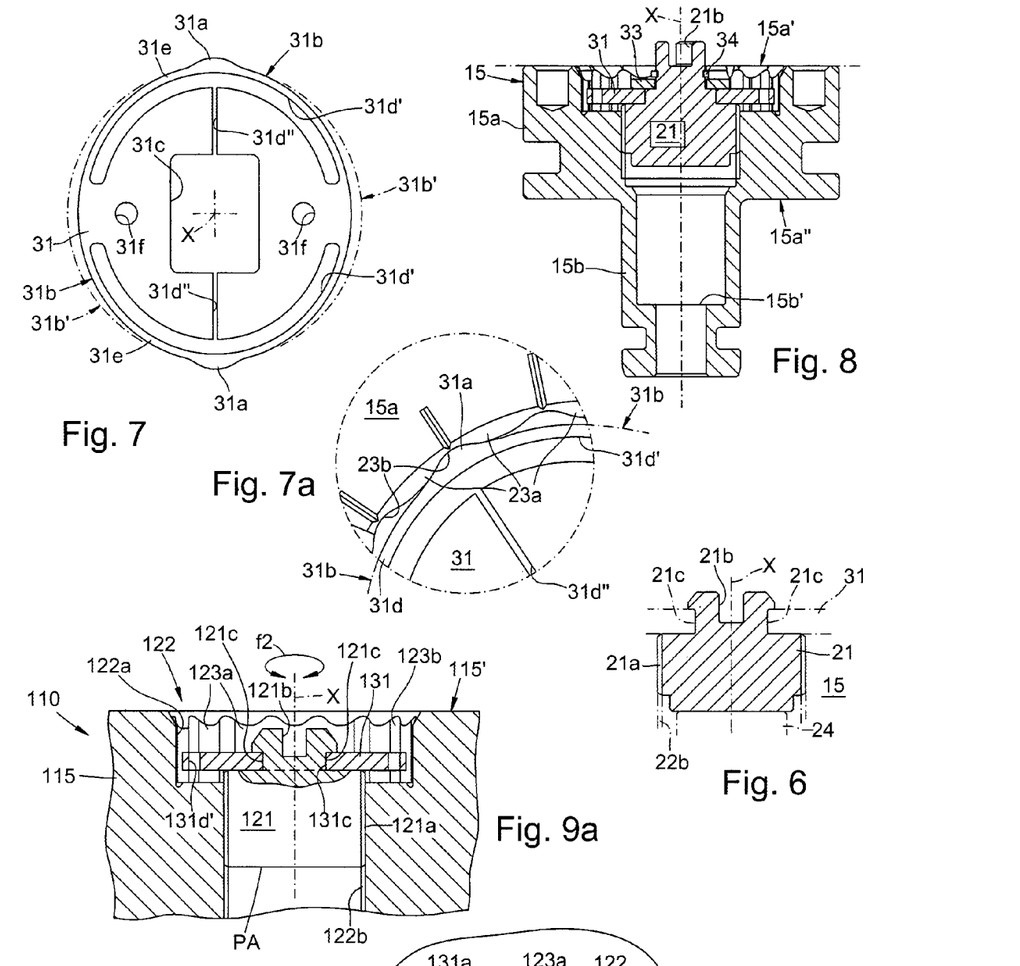
FIG. 6 is a section, corresponding to line VI-VI of FIG. 4, of an adjustment element of the closure assembly of the invention of FIG. 1.
FIG. 7 is a plan view of a fixing washer of the closure assembly of FIG. 1.
FIG. 7a shows in an enlarged scale a region of FIG. 4, indicated with a dot-dash circle, including the fixing washer of FIG. 7.
FIG. 8 is a partial sectional view, along a longitudinal plane, of a variant of the closure assembly of FIGS. 1 and 3.
FIGS. 9a and 9b show in a schematic and essential way, respectively in longitudinal section and in plan, a more general regulation device, corresponding to the closure assembly of the present invention, for regulating micrometrically and fixing in the axial sense a threaded element.

In detail, with reference to FIGS. 7 and 7a, the elastic washer 31 has an external edge 31b which exhibits an approximately elliptic form in the non deformed configuration of the same elastic washer 31, as shown in FIG. 7, and along which the two protrusions 31a are defined.

Further, the elastic washer 31 exhibits a central hole 31c, for instance of rectangular form, that, at the mounting of the elastic washer 31 on the adjustment element 21, is adapted to be couple with a corresponding throat or groove 21c, formed in an end portion, of rectangular section, of the adjustment element 21.

In this way the adjustment element 21 and the elastic washer 31 are coupled together and made integral each other in the rotation around the axis X and in the axial movement along it.

Still, the elastic washer 31 exhibits a special configuration comprising two semi-circular cuts 31d' that extend respectively along two opposite portions 31e of the external edge 31b, in the zone of the protrusions 31a; two linear cuts 31d" each extending in a radial sense between a corresponding cut 31d' and the central hole 31b; and moreover two holes 31f for the application of a special tool for the assembling of the elastic washer 31 on the adjustment element 21.

This special configuration, including a plurality of cuts, has the function of giving the washer 31 a certain capability of getting deformed elastically, both in the zone of the central hole 31c, so as to allow the elastic assembling of the washer 31 in the groove 21c, by surmounting the stair defined by the latter, and also in the zone of the two portions 31e, of the external edge 31b, with the protrusions 31a, so as to allow these two protrusions 31a to cooperate with and to elastically follow the projections 23a and the notches 23b, during the rotation of the adjustment element 21 while regulating the closing rod 16 in the closed position P2.

It is noted that the elastic washer 31 has a configuration which allow it to get deformed and thereby to acquire, in comparison to the original elliptic profile of the edge 31b, an approximately circular external profile 31b', as represented with a dot-dash line in FIG. 7, when the protruding portions 31a of the elastic washer 31 step over the projections 23a that are formed in the internal seat 22, during the rotation of the adjustment element 21 relatively to the body 15a of the driving piston 15.

Therefore, owing to this configuration, the elastic washer 31, during the regulation of the closing rod 16, i.e. with the elastic washer 31 rotating jointly with the adjustment element 21, is adapted to get deformed along its external profile without interfering with the portion 22a of the seat 22.

In the use, with the cover 28 disassembled from the fixed support 13d, the operator places the driving piston 15 with the respective lower side 15a" into contact with the surface 17b, so that the position assumed by the closing rod 16 corresponds to the closed position P2.

Then the operator, by screwing or unscrewing the adjustment element 21 in the respective seat 22, as indicated by a double arrow f2, regulates and exactly positions the closing rod 16 in the determine closed position P2, desired.

For instance, to this purpose, the operator can use a special tool suitable for measuring in some way the protrusion H (FIGS. 1 and 1a) of the tip 16b of the closing rod 16 from the tip portion of the injection nozzle 12, and then rotates the adjustment element 21 up to when such protrusion H corresponds to a predetermined value, in turn defining the exact closed position P2, as desired, of the closing rod 16.

Therefore, in this way, i.e. by screwing or unscrewing in a sense or in the other the adjustment element 21 in the respective internal seat 22, the closing rod 16 is regulated micrometrically in the determined closed position P2, that is requested.

While making this regulation, the protruding portions 31a of the elastic washer 31 elastically cooperate with the projections 23a and the notches 23b of the internal seat (22), whereby, once the closing rod 16 has been regulated in the closed position P2, i.e. at the end of its regulation, each of these two protruding portions 31a are housed and blocked in a respective notch 23a (FIG. 7a), so as to firmly fix the adjustment element 21 and hence also the closing rod 16 in such closed position P2.

Then the cover is reassembled 28, whereby the injection unit 11 is ready to operate, with the closure assembly 10 being opportunely regulated so as to position, during working of the injection unit 11, the closing rod 16 in the determined closed position P2, as requested, and thereby to close in an optimal way the injection hole 13' by means of the closing rod 16.

In detail, in the operation of the injection unit 11, when the driving piston 15 drives the axial movement of the closing rod 16 from the open position P1 to the closed position P2, the intermediate element 24 presses directly into contact with the upper surface of the head 16a, so as to push the closing rod 16 from the position P1 to that P2.

Instead, when the driving piston 15 drives the movement of the closing rod 16 from the closed position P2 to the open position P1, the stair 15b', that is formed in the portion 15b of the driving piston 15, cooperates, by recovering the light L, with the lower and protruding zone, of the head 16a, opposite to that provided for cooperating with the intermediate element 24, so as to move and drag the closing rod 16 from the position P2 to the position P1.

It is therefore clear, from the preceding description, that the present invention fully achieves the objects to which it was intended, and in particular provides a closure assembly which is capable of allowing a precise and micrometric regulation of a respective closing rod in the closed position, in order to close an injection hole, and which moreover is capable of firmly fixing the same closing rod in the determined closed position that is set by such micrometric regulation.

It is also clear, from the same description, that the elastic washer, included in the closure assembly of the invention and provided for rotating jointly with the adjustment element which controls and regulates the closed position of the closing rod, appears capable of performing a double function, i.e. both the function of allowing a micrometric axial regulation, defined by discrete steps, of the same adjustment element, and the function of firmly fixing it in an automatic way, once the closing rod has been regulated and positioned in the requested axial position.

Of course, without prejudice to the basic principle and concepts of the present invention, the embodiments and construction details of the closure assembly, proposed here, may be abundantly varied with respect to what has been described and illustrated up to here, without departing from the scope of the invention itself.

For instance, according to a variant represented in FIG. 8, a further washer 33 in combination with an additional "seeger" ring 34 can be provided, in comparison to the embodiment 10 of FIGS. 1 and 3, in order to block in a sure way, along the axis X, the elastic washer 31 that is provided for fixing the adjustment element 21, at the end of its axial regulation.

Description of a Device According to the Invention for the Micrometric Regulation and the Fixing of a Threaded Element in One Determined Axial Position The invention has been described up to here with reference, even if in the form of a preferred and not exclusive way, to a closure assembly, indicated with 10, that is associated with an injection unit 11 for the injection moulding of plastic material into a mould 13 and is adapted to open and to selectively close an injection hole 13' of the same mould 13.

However the essential concept of the present invention cannot be confined and goes well beyond the use and application of the closure assembly 10 to close and open this injection hole, so as to appear as comprising a more general regulation device or system for the micrometric regulation and the fixing of a generic threaded element or organ, as in particular a screw.

Figure 9B:
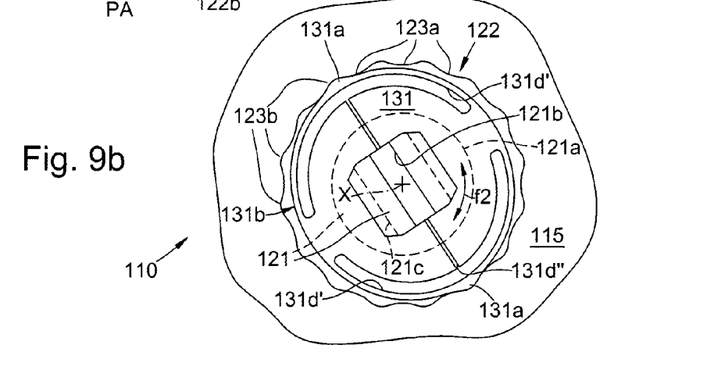

Such micrometric regulation device, indicated generally with 110 and with the respective parts marked by numerical references increased of 100 in comparison to the corresponding parts of the closure assembly 10, is schematically represented in FIGS. 9a and 9b.

In detail the regulation device 110 includes a support part or body 115, fixed, that exhibits an external surface 115', and a threaded element 121 that is provided with a threading 121a of fine pitch, wherein, as shown by double arrow f2, the threaded element 121 is adapted to be screwed or unscrewed in a corresponding threaded portion 122b of an internal seat 122, in turn extending along a respective axis X at the interior of the fixed part 115, in order to regulate axially along the axis X the threaded element 121 in one determined axial position PA with respect to the fixed part 115, and wherein the internal seat 122 and the threaded element 121 are so configured that the latter does nor projects from the external surface 115.'

Moreover, an elastic fixing element or washer 131, having substantially the same configuration of the elastic washer 31, is integrally coupled in the rotation and in the axial translation to the threaded element 121 and is provided along the external perimeter of two protrusions 131a provided for cooperating elastically with a plurality of projections and notches, respectively 123a and 123b, formed in a portion 122a, substantially cylindrical and adjacent to the external surface 115', of the internal seat 122, in order to firmly fix the threaded element 121, at the end of the regulation, that is once the threaded element 121 has been positioned micrometrically in the axial position PA, desired, along the axis X.

In the use of the device 110, i.e. during the rotation, in the seat 122, in one sense or the other of the threaded element 121 in order to regulate in a micrometric way its axial position with respect to the fixed part 115, the elastic fixing element 131 rotates and moves along the axis X jointly with the threaded element 121.

Besides, during such regulation, the elastic fixing element 131 externally gets deformed and assumes from an initial elliptic profile 131b, corresponding to its non deformed configuration, an approximately circular profile, that however is such as to not interfere with the profile of the portion 122a, every time the protrusions 131a of the fixing element 131 step over the projections 123a.

Then, at the end of the regulation, i.e. when the threaded element 121 is finally regulated in the axial position PA, desired, the elastic fixing element 131 assumes a stable position in which the respective two protruding portions 131a are housed and blocked in two corresponding notches 123b of the internal seat 122, so as to firmly fix the threaded element 121 in such final axial position PA.

Therefore, by summarising, the fixing element 131, owing to its special configuration, fit to get deformed when cooperating with the projections 123a and the notches 123b of the internal seat 122, is adapted, other than to allow the micrometric regulation, as defined by discrete steps, of the axial position of the threaded element 121 with respect to the fixed part 115, also to stop and firmly fix in an automatic way the same threaded element 121, once it has been regulated in the requested axial position PA.

The invention claimed is:

1. A closure assembly for an injection unit of plastic material into a mould, comprising:

a driving piston adapted to move along a respective axis;

a closing rod, arranged coaxially to said driving piston, having a first end or head, associated with said driving piston, and a second end or tip, opposite to the first end and suitable for cooperating with an injection hole of said mould, said driving piston being adapted to drive an axial movement of said closing rod between an open position in which said closing rod opens said injection hole, and a closed position, in which said closing rod closes by the respective tip said injection hole, and micrometric regulation means for regulating axially in a micrometric way the closing rod in the respective said closed position, wherein said micrometric regulation means comprise at least one adjustment element provided with a thread having a fine pitch, with said adjustment element being adapted to be screwed or unscrewed in a corresponding threaded internal seat, formed in said driving piston, so as to adjust in a micrometric way, along said axis, the relative position of the closing rod with respect to the body of said driving piston and consequently regulate axially the closing rod in said closed position, wherein said adjustment element is entirely housed in said internal seat so as not to project from the body of said driving piston (15), wherein there are further provided fixing means, associated with said micrometric regulation means, for stably fixing said adjustment element (21) with respect to the body of said driving piston, once said closing rod has been regulated in said closed position, wherein said internal seat, in which said adjustment element is housed, comprises:

a first upper portion, substantially cylindrical, formed adjacently to an upper side, spaced from the closing rod, of said driving piston, and provided along its internal cylindrical surface with a plurality of projections and notches;

a second threaded intermediate portion, in which said adjustment element is adapted to be screwed or unscrewed in order to regulate said closing rod in said closed position; and a third lower portion, which houses the head of said closure rod; and wherein said fixing means comprise an elastic washer capable of rotating and moving axially jointly with said adjustment element and having along the external perimeter at least one protruding portion provided for cooperating elastically with the projections and the notches formed in said first upper portion of the internal seat of said driving piston, whereby, when said adjustment element is screwed or unscrewed, that is rotated in the two senses, in said internal seat for regulating micrometrically said closure rod in said closed position, said elastic washer is capable, by elastically cooperating through the respective protruding portion with said projections and notches, of firmly fixing said adjustment element, once said closing rod has been regulated in said closed position.

2. The closure assembly according to claim 1, wherein said elastic washer comprises:

a central hole for the rotational coupling of said elastic washer with said adjustment element;

an external profile having, in the non-deformed configuration of the elastic washer, an approximately elliptic shape; and a plurality of cuts capable of conferring a certain elastic yieldingness to said elastic washer in the area of the respective external profile adjacently to said at least one protruding portion, whereby said elastic washer, when cooperating through said protruding portion with said projections and notches during the micrometrical regulation of the closure rod, undergoes an elastic deformation, and in particular assumes, from said profile having said approximate elliptic shape, an external profile having an approximately circular shape, adapted to not interfere with the upper portion of said internal seat defining said projections and notches.

3. The closure assembly according to claim 1, wherein an intermediate element is interposed between said adjustment element, adapted to rotate in said seat, and the head of said closing rod, for transmitting to the latter the axial regulation set with the adjustment element, whereby said intermediate element remains substantially still so as to avoid any sliding between said intermediate element and the seat in said driving piston, when said adjustment element is screwed or unscrewed in said second threaded intermediate portion, of said internal seat, in order to regulate said closing rod in said closed position.

4. The closure assembly according to claim 1, wherein said third lower portion of said internal seat has a cylindrical shape and is associated with a stair, formed in said driving piston, that is provided for cooperating with the head of said closing rod, when said driving piston drives the axial movement of said closing rod from said closed position to said opened position.

5. The closure assembly according to claim 1, wherein the head of the closing rod is housed with a certain axial gap in said third lower portion of said internal seat, formed in said driving piston.

6. A moulding system or injection unit for the injection moulding of plastic material comprising the closure assembly according to claim 1, in order to control the opening and the closing of an injection hole.

7. A device for micrometrical regulation and fixing comprising:

a fixed support part or body;

a threaded element screwed in said support body; and an elastic washer associated with said support body and said threaded element;

wherein said support body defines a respective internal seat, extending along an axle, having a first portion, substantially cylindrical, formed adjacently to an external side of said support body and provided along its internal surface of a plurality of projections and notches and a second threaded portion, provided with a thread having a fine pitch and in which said threaded element is screwed, that is formed adjacently to said first portion on the opposite part to said external surface; and wherein said elastic washer is coupled with said threaded element so as to rotate and move axially jointly with said threaded element and externally exhibits at least a protruding portion associated with the projections and the notches formed in said first portion of the internal seat, whereby, when said threaded element is rotated in said internal seat in order to be regulated in a determined axial position relatively to said fixed support body, said elastic washer, while rotating jointly with said threaded element, cooperates elastically, through the respective protruding portion, with said projections and notches, so as to firmly fix said threaded element, once it has been regulated in said determined axial position.

8. The device according to claim 7, wherein said elastic washer exhibits a central hole for the coupling of said elastic washer with said threaded element; an external profile, along which said protruding portion is formed, that exhibits, in the non-deformed configuration of the elastic washer, an approximately elliptic form; and a plurality of cuts suitable for conferring a certain elastic yieldingness to said elastic washer in the zone of said protruding portion, whereby said elastic washer undergoes an elastic deformation, when said elastic washer cooperates, through said protruding portion, with said projections and notches, during the rotation and micrometrical regulation of said threaded element in said determined axial position, and said elastic washer assumes, from said external profile, of approximately elliptic form, an external profile, having an approximately circular form, adapted to not interfere with the first portion of said internal seat defining said projections and notches.

* * * * *